Patented June 19, 1945

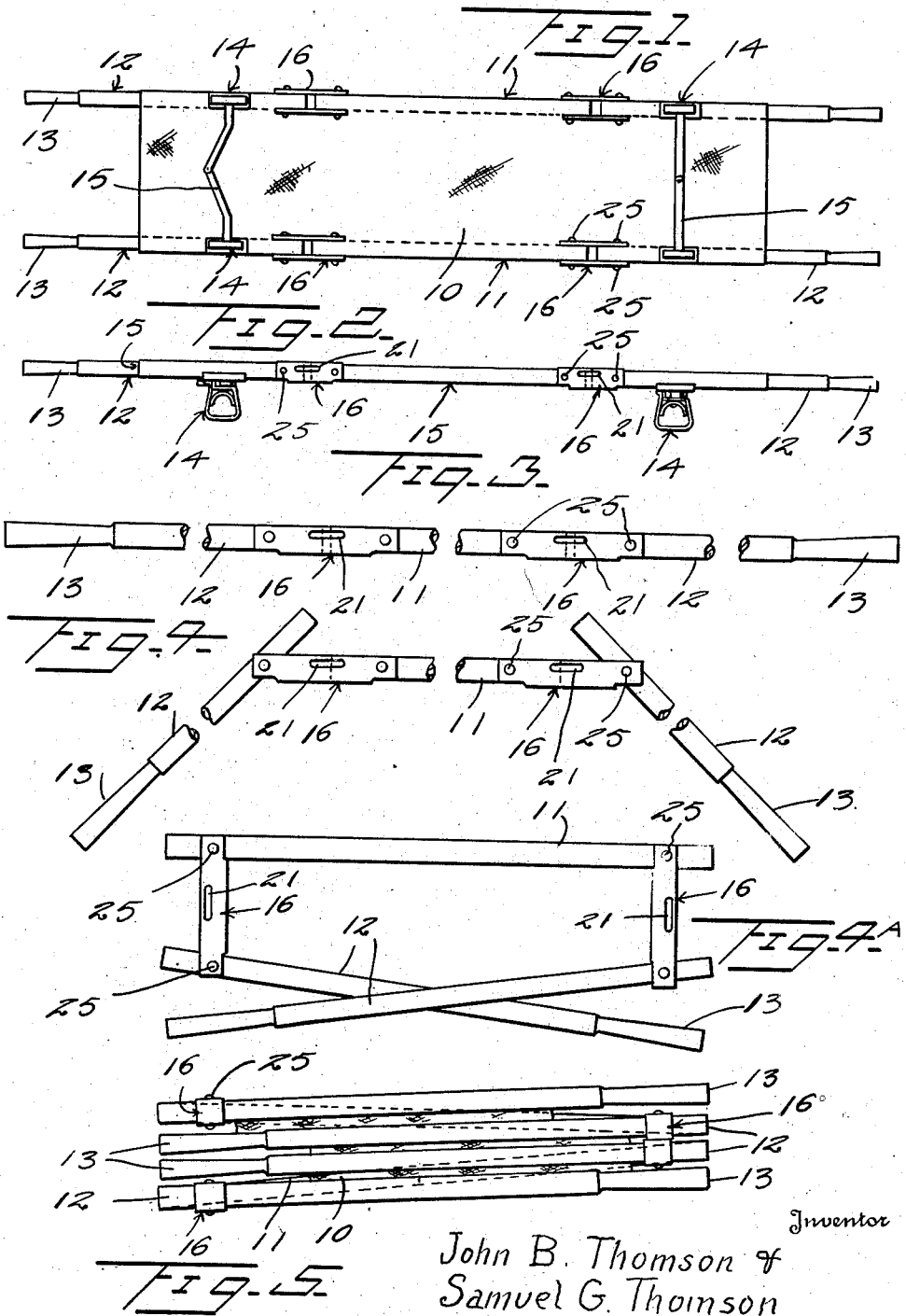

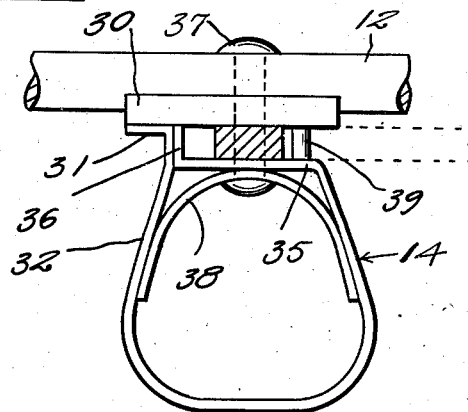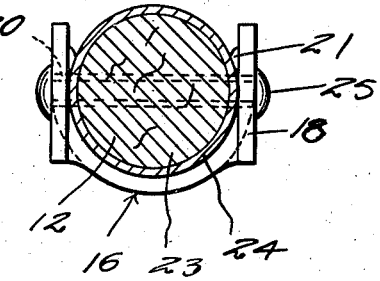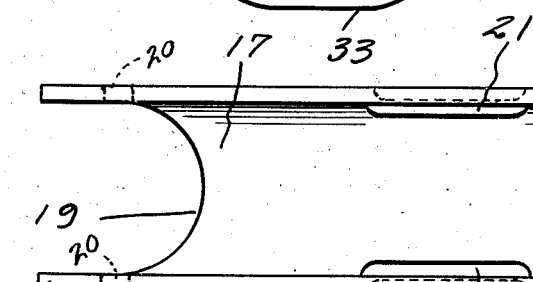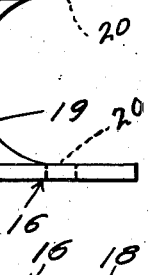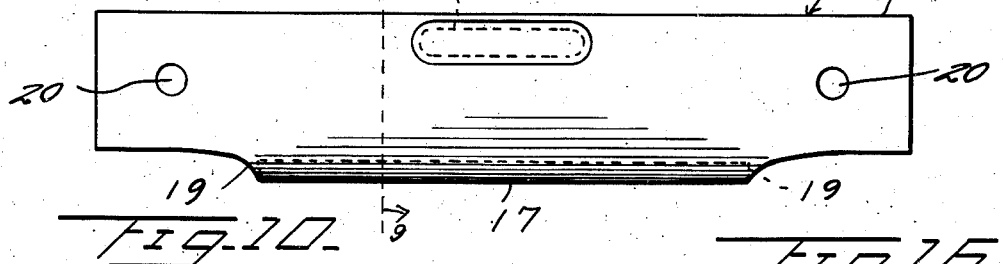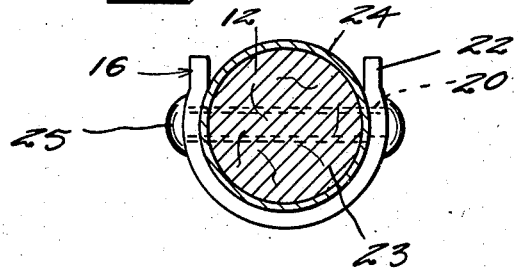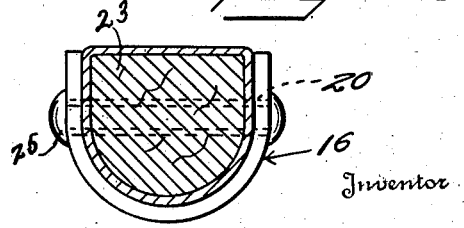

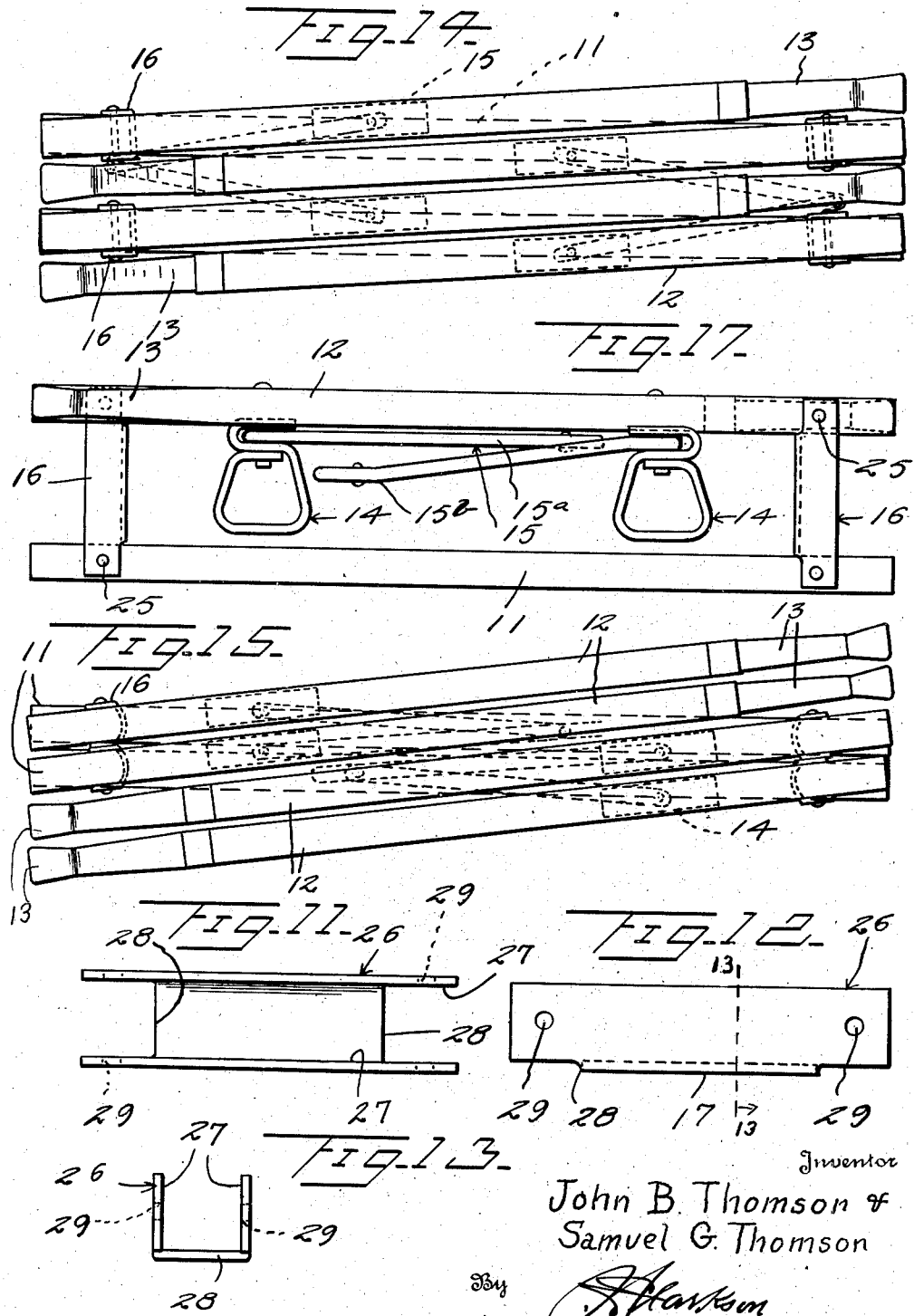

2,378,809

UNITED STATES PATENT OFFICE 2,378,809

FOLDING LITTER

John B. Thomson, Manhasset, and Samuel G. Thomson, Flushing, N. Y., assignors to Zimmer-Thomson Corporation, Flushing, N. Y., a corporation of New York Application March 26, 1943, Serial No. 480,688

9 Claims. (Cl. 5—82)

This invention relates to litters for transporting sick or injured persons.

The present invention has special reference to folding litters of the hinge type which do not depend on a close fit precision joint.

In the usual type of folding litter the structure includes a pair of side poles, jointed or rigid, a litter bottom of flexible material such as canvas or the like extending between the poles, and jointed means connecting the poles. In the present invention the jointed means is so arranged that the poles may be held widely spaced to tension the litter bottom or may be brought close together so that the structure is very compact and when folded is substantially one third the length of extended litter.

Folding litters with close fitting or pull-apart joints are undesirable since the plating or protective coating will wear off in very short time and consequently will rust and render the litter useless, whereas with the present improved hinge structure these difficulties are overcome and the life of the litter is extended.

Normally the side bars or poles are jointedly arranged each with two sections hingedly connected, so that when one end of the litter is folded over on the other it still occupies considerable longitudinal space.

It is one important object of the present invention to so arrange and connect the side pole sections of such a litter as to have three sections in each pole thus requiring much less longitudinal space in storing the litter than where each pole has only two sections.

A second important object of the invention is to provide a novel hinge joint for connecting the sections of the litter pole, which permits the end sections to lie in substantial parallel relation when folded, and at the same time permits the folded end sections to lie in a plane through their axis parallel to a plane thru the axis of the middle section.

A third important object of the invention is to so arrange the hinge connections of the pole section that, when the litter is in use, the pole sections will be held firmly in alignment.

A fourth important object of the invention is to so arrange the stretcher bar common in folding litters that they will not interfere with each other when the litter is folded.

A fifth important object of the invention is to have one of the folded stretcher bars substantially parallel to the pole while the other stretcher bar is deflected downwardly to enable a more compact folding of the litter.

With the above and other objects in view as will be presently apparent, the invention consists in general in novel details of construction and combinations or parts hereinafter fully described, illustrated in the accompanying drawings and particularly claimed.

In the accompanying drawings, like characters of reference indicate like parts in the several views, and:

Figure 1 is a bottom plan view of a litter constructed in accordance with this invention and in expanded position.

Figure 2 is a side elevation thereof in erect position.

Figure 3 is an enlarged broken view of a single litter pole in extended position particularly showing the hinged construction.

Figure 4 is a view of the parts shown in Figure 3 but partly folded and Figure 4a shows the parts more completely folded.

Figure 5 is a bottom plan view showing one arrangement of the completely folded litter.

Figure 6 is a detail view showing one litter leg arrangement for use in this invention.

Figure 7 is a top plan view of a hinge member for poles having ends of circular cross-section.

Figure 8 is a side view thereof.

Figure 9 is a section on the line 9—9 of Figure 8 with a pole end positioned and reinforced to prevent splitting.

Figure 10 is a view showing a modification of Figure 9.

Figure 11 is a plan view of a modified hinge joint adapted for use with poles having hinge ends of rectangular cross-section.

Figure 12 is a side elevation of Figure 11.

Figure 13 is a section on the line 13—13 of Figure 12.

Figure 14 is a view similar to Figure 5 showing a modified method of folding the litter.

Figure 15 is a similar view showing a second modified folding of the litter.

Figure 16 is a cross-section of a further modification of the joint.

Figure 17 is a side elevation of Figure 15.

In the several embodiments of the invention herein described and illustrated certain fundamental features are to be found. For instance each form shows a litter, having a bottom of canvas or the like and having three sections, the middle section being indicated at 11 and the end sections at 12, the three sections being all substantially of the same length and the end sections being provided with handles 13. The end sections are provided with legs 14 connected by jointed stretcher bars 15 and these end sections are connected to the middle sections by channel like hinge members generally indicated at 16.

The variations of the several modifications are to be found more particularly in the construction at the hinge joints and we may now consider the form of hinge and joint shown best in Figures 7, 8, and 9. In this form there is provided a trough or channel like metal structure having a central portion 17 of substantially semi-circular bottom which merges at its ends into flat side walls 18 parallel to each other. The bottom or floor of this member is cut back at the ends to form semi-circular stops 19. In the end walls are provided alined pivot holes 20 and at the middle of each side wall is provided a stop in the form of a dented protuberance or boss 21.

A slight modification of this stop arrangement is shown in Figure 10 in which the boss is replaced by having the upper edges of the members pressed toward each other as at 22.

In both of these forms the pole sections have ends 23 of circular cross-section and preferably these ends are fitted with metallic ferrules 24 to prevent splitting or other damage to the ends under the stresses due to use.

Pivot bolts 25 pass through the ends of the pole sections and the bolt-holes 20. It is now to be noted that some longitudinal play may be allowed between the pivot bolts and the holes for purposes which will be presently explained.

From an inspection of Figures 9 and 10 it will be noted that the ends of the pole sections will snap into place when the litter is open and be there held by the bosses 21 or side portions 22 as the case may be.

In Figures 11, 12 and 13 is shown a construction for use with poles having square ends. Here the trough or channel is of rectangular cross-section in its middle part 26 and has projecting wings 27 so that the bottom of the channel has at its ends stop edges 28. The wings are provided with pivot bolt holes 29.

In Figure 16 there is shown a slight further modification of the hinge construction adapted for a half-round pole end.

It will be seen from Figures 3, 4 and 5 that the pivoted ends of the pole sections, when aligned, engage the bottoms of the hinge members and thus, when the litter is lifted, will remain in alignment. When, however, it is desired to fold the litter it may have the end pole sections swing on the pivots and the hinge members swing on the pivots of the mid-sections to assume such positions as shown in Figures 4 and 4a. Obviously, the cut back portions of these hinge members limit the movement of the respective parts so that the hinge members are limited to positions ranging from alignment with the pole sections to positions at right angles thereto. Due to the resiliency of the parts, the end sections of each pole may be brought to lie alongside each other, this slight freedom of lateral movement being assisted in certain modifications by looseness in the pivots. Each pole having been thus folded the two sides of the litter may, by the construction of the spreader members, presently to be described, be brought side by side to form a compact bundle as in Figure 5. Obviously the end sections of each pole may be positioned as in Figure 5, as in Figure 14 or as in Figure 15.

A suitable type of leg to be carried by each pole end section is shown at Figure 6. Here there is provided a saddle 30 fitting the pole. The leg itself is formed from a strip of suitable metal provided at one end with a foot 31, welded to the underside of the saddle at one end thereof. The strip then extends down as at 32 and across as at 33 to form a ground engaging portion. The strip then extends back toward the saddle at 34 but is bent to provide a portion 35 in parallel spaced relation to the saddle and with a terminal prop or support 36 engaging the saddle. A securing bolt 37 passes through the pole, the saddle, an end of each spreader bar and the portion 35 and also through a brace member 38. A stop 39 limits the movement of the spreader bar member. In order that these spreader bars may not conflict with each other when the two sides of the litter are brought into juxtaposition as in Figure 5 one bar is arched down and the other leg horizontal, the bar at the head end of the litter where the greater weight of a patient is disposed being the one which is arched down.

Referring now to Figure 17 it will be noted that the hinge members 16 are of substantial length so that upon folding the litter the end sections 12 will be spaced well away from the middle section 11 and in the space will be received the legs 14 and the stretcher bars 15.

While these stretcher bars are the usual jointed construction one of the bars is preferably straight as at 15a while the middle joint of the other bar is dropped down as at 15b. The straight bar will thus lie close to and substantially parallel with the end sections of the pole, while the downward deflection of the remaining bar permits the two bars to be received without interference with each other in the space between the middle and end pole sections.

It is to be further understood that the stretcher bars may be so designed that they interfit, somewhat as shown in Figure 17 when the stretcher is folded.

It is further to be understood that the poles may be made also of laminated wood or even of tubular metal or a plastic.

There has thus been provided a simple and efficient device of the kind described and for the purpose specified.

It is obvious that minor changes may be made in the form and construction of the device without departing from the material spirit of the invention.

What is claimed as new is:

1. A litter pole having a middle portion and two end portions with the middle portion connected at opposite ends by link joints to said end portions, each of said link joints comprising a U-shaped member in cross-section with adjacent ends of the pole portions pivoted to swing through the open side of the U-shaped member, the sides of said U-shaped member being provided with inwardly projecting ribs engaging the pole ends remote from the back of the member when the pole portions are in lengthwise alignment.

2. A litter pole having a middle portion and two end portions with the middle portion connected at opposite ends by link joints to said end portions, said middle and end portions being of substantially the same length, each of said link joints comprising a U-shaped member in cross-section with adjacent ends of the pole portions pivoted to swing through the open side of the U-shaped member, the sides of said U-shaped member being provided with inwardly projecting ribs engaging the pole ends remote from the back of the member when the pole portions are in lengthwise alignment.

3. A litter including a pair of poles and a litter bottom connecting the poles, stretcher bars connecting said poles with one of said stretcher bars deflected downwardly out of relation to the plane of the other stretcher bar.

4. A litter pole having three lengthwise portions comprising a middle portion and end portions and having a pair of link joints of equal length connecting the three lengthwise portions of the pole, said link joints each comprising a plate bent to a U-shape, said bent plate being laterally rigid thru its mid-length and tortionally flexible at its ends, said flexibility permitting one of said end pole portions to diverge from a longitudinal vertical plane thru the middle one of said pole portions whereby said end portions lie in side-by-side arrangement when the litter is in lengthwise folded position.

5. A litter pole having a middle portion and two end portions with the middle portion connected at opposite ends by link-joints of equal length to said end portions, said link joints each having a middle portion of U-shaped cross-section, and having the ends of the side walls of said U-shaped portion projecting freely from said middle portion, said link-joints being formed of flexible material whereby the free end portions may be sprung out of alinement with the middle portion, said links serving in one position to hold the pole middle and end portions in lengthwise alinement with the joints alined therewith, and in a second position to hold the pole end portions in side-by-side arrangement substantially parallel to the pole middle portion and spaced therefrom, said pole end portions lying in the second position with their axes in the same plane, and the pole middle portion lying in a second plane parallel to the plane of the pole end portions, and the pole end portions diverging from a plane perpendicular to said second plane.

6. A litter pole having a middle portion and two end portions, all of substantially the same length, link means connecting the opposite ends of the middle portion respectively to one end of an end portion, said link means each being of the same length and each having a relatively rigid central portion and tortionally deflectible end portions, one of said tortionally deflectible end portions being pivotally connected to an end portion of said pole and the other of said tortionally deflectible end portions being pivotally connected to an end of said middle portion of said litter pole, whereby the end portions of the pole may be deflected laterally and swung lengthwise to folded position in side by side relation spaced from and parallel to said middle portion.

7. A litter pole having a middle section and two end sections with the middle section pivotally connected at opposite ends by link members of equal length to said end sections on transverse pivots for the lengthwise pivoting of said end sections, said link members being substantially rigid intermediate their ends and having flexible end portions whereby said end sections may be deflected laterally into folded position in a side-by-side relationship in which the pivoting axis and the longitudinal center-line of one of said end sections lie in the same plane as the pivoting axis and one longitudinal center-line of said other end section.

8. A folding litter or the like comprising side poles joined by a flexible bottom and by transverse spreader-bars, said poles each having a middle section and two end sections with the middle section pivotally connected at opposite ends by link members of equal length to said end sections on transverse pivots for the lengthwise pivoting of said end sections, said link members being substantially rigid intermediate their ends and having flexible end portions whereby said end sections may be diverged sidewise into side-by-side folded relationship in a plane that passes through the longitudinal center-line and the pivoting axis of all four of said end sections.

9. A folding litter or the like comprising side poles joined by a flexible bottom and by transverse spreader-bars, said poles each having a middle section and two end sections with the middle section connected at opposite ends by link members of equal length to said end sections on transverse pivots for the lengthwise pivoting of said end sections, a leg attached to each of said end sections, said spreader-bars being formed of hinged sections whereby the litter may collapse sidewise, and said link members being substantially rigid intermediate their ends and having flexible end portions whereby said end sections may be diverged sidewise into side-by-side folded relationship in a laterally disposed plane that passes through the longitudinal center-line and the pivoting axis of all four of said end sections, said plane being spaced from and parallel to said middle section, said legs and spreader-bars being enclosed within said space and lying in a compact assembly entirely within the confines of the sides of a substantially square compact package in cross-section defined by the outermost faces of said end and middle sections.

JOHN B. THOMSON.
SAMUEL G. THOMSON.